US008911585B2

(12) United States Patent
Barlag et al.

(10) Patent No.: US 8,911,585 B2
(45) Date of Patent: Dec. 16, 2014

(54) DEVICE AND METHOD FOR MANUFACTURING A FIBER-REINFORCED COMPOSITE FUSELAGE SHELL FOR AN AIRCRAFT

(75) Inventors: Carsten Barlag, Jever (DE); Christian Steiger, Kissing (DE); Niels Deschauer, Markdorf (DE)

(73) Assignees: Airbus Operations GmbH (DE); Premium Aerotec GmbH (DE)

( * ) Notice: Subject to any disclaimer, the term of this patent is extended or adjusted under 35 U.S.C. 154(b) by 60 days.

(21) Appl. No.: 13/489,795

(22) Filed: Jun. 6, 2012

(65) Prior Publication Data
US 2013/0000815 A1    Jan. 3, 2013

Related U.S. Application Data

(63) Continuation of application No. PCT/EP2010/069052, filed on Dec. 7, 2010.

(60) Provisional application No. 61/267,222, filed on Dec. 7, 2009.

(30) Foreign Application Priority Data

Dec. 7, 2009 (DE) .......................... 10 2009 056 978

(51) Int. Cl.
| B29C 65/00 | (2006.01) |
| B29C 47/00 | (2006.01) |
| B29C 70/44 | (2006.01) |
| B29C 33/48 | (2006.01) |
| B29D 99/00 | (2010.01) |
| B29C 70/32 | (2006.01) |
| B29L 31/30 | (2006.01) |

(52) U.S. Cl.
CPC ......... *B29C 70/32* (2013.01); *B29L 2031/3082* (2013.01); *B29C 70/443* (2013.01); *Y02T 50/43* (2013.01); *Y02T 50/433* (2013.01); *B29C 33/485* (2013.01); *B29D 99/001* (2013.01)
USPC ............................ 156/285; 156/286; 156/245

(58) Field of Classification Search
USPC ......................................... 156/245, 285, 286
See application file for complete search history.

(56) References Cited

U.S. PATENT DOCUMENTS 5,256,056 A * 10/1993 Brown et al. .................. 425/595
5,482,593 A * 1/1996 Kuhn et al. .................... 156/521
(Continued)

FOREIGN PATENT DOCUMENTS

DE         10331358 A1    2/2004
DE    102007060029 A1    6/2009
(Continued)

*Primary Examiner* — Richard Crispino
*Assistant Examiner* — Matthew Hoover
(74) *Attorney, Agent, or Firm* — Lerner, David, Littenberg, Krumholz & Mentlik, LLP

(57) ABSTRACT

A device and a method for manufacturing a fiber-reinforced fuselage shell for an aircraft, which fuselage shell for the purpose of reinforcement comprises several stringers that are spaced apart from each other, wherein the device includes a base frame comprising several supporting walls of different lengths for forming a curved mounting surface for the fuselage shell to be manufactured, wherein several actuators that extend radially outwards and that are longitudinally adjustable are affixed to the mounting surface, at the distal ends of which actuators in each case mold channels for receiving the stringers are attached, which mold channels are interconnected by means of flexible intermediate elements and/or further mold channels for forming a vacuum-tight closed mold surface.

6 Claims, 3 Drawing Sheets

(56) References Cited

U.S. PATENT DOCUMENTS

| | | |
|---|---|---|
| 6,298,896 B1 | 10/2001 | Sherrill et al. |
| 6,511,570 B2 * | 1/2003 | Matsui .................. 156/245 |
| 6,613,258 B1 * | 9/2003 | Maison et al. ............ 264/102 |
| 2006/0108058 A1 * | 5/2006 | Chapman et al. ........... 156/245 |
| 2010/0276069 A1 | 11/2010 | Lengsfeld et al. |

FOREIGN PATENT DOCUMENTS

| | | |
|---|---|---|
| EP | 2062814 A1 | 5/2009 |
| WO | 2007148301 A2 | 12/2007 |

* cited by examiner

DEVICE AND METHOD FOR MANUFACTURING A FIBER-REINFORCED COMPOSITE FUSELAGE SHELL FOR AN AIRCRAFT

CROSS-REFERENCE TO RELATED APPLICATIONS

The present application is a continuation of International Application No. PCT/EP2010/069052, filed on Dec. 7, 2010, which claims the benefit of the filing date of German Patent Application No. 10 2009 056 978.2, filed Dec. 7, 2009 and of U.S. Provisional Application No. 61/267,222, filed Dec. 7, 2009, the disclosures of which are incorporated herein by reference in their entireties.

TECHNICAL FIELD

The present invention relates to a device and to a method for manufacturing a fiber-reinforced composite fuselage shell for an aircraft, which fuselage shell for the purpose of reinforcement comprises several stringers that are arranged so as to be spaced apart from each other, with the device comprising a base frame for forming a curved mounting surface for the fuselage shell to be manufactured.

The field of application of the present invention predominantly relates to aircraft construction. In particular, wide-bodied commercial aircraft or transport aircraft are usually constructed in a shell construction method, in particular a half-shell construction method. In aircraft construction the term "half-shell construction method" refers to the construction of the fuselage, usually in two shells. When joined, the two shells result in an almost circular or oval cross section of a fuselage section. Several fuselage sections, aligned one behind the other for the rear, the middle, and the cockpit section, form the aircraft fuselage. In the manufacture of aircraft fuselages, the use of fiber-reinforced composite materials, such as glass-fiber-reinforced or carbon-fiber-reinforced plastics, is becoming increasingly common. In order to stiffen the fuselage and in order to be load-absorbing, the shells are usually equipped with stiffening elements, e.g. T-stringers or omega-stringers.

Frequently, the half shell for the aircraft fuselage is manufactured in a negative-adhesive-mold laminating-bonding device in that at that location fiber material and resin are placed and cured in various methods. In this arrangement the laminating-bonding device provides the component with the corresponding external contour. Demolding is often followed by subsequent mechanical cutting before assembly of the half shells modeled in this manner can be carried out.

BACKGROUND OF THE INVENTION

From DE 103 31 358 A1 a device for efficient series production of a fuselage shell for an aircraft, which fuselage shell comprises fiber-reinforced composite materials, is known. In order to improve the strength of the fuselage shell it comprises stringers that extend so as to be spaced apart from each other. On a planar base support a grid of several supporting walls of different lengths is attached in such a manner that their ends form a semicircle, wherein said supporting walls are arranged relative to the base support at angles determined by the radius of the semicircle. Modular profiles are attached to the distal ends, which form the semicircle of the supporting walls, which profiles cover the spaces between the supporting walls, and with the outer surfaces of said profiles corresponding in the negative to the interior contour of the integral structural component to be manufactured. The grid of the supporting walls and the division of the modular profiles are designed in such a manner that the joining gap of the modular profiles in each case is arranged underneath the position of a stringer. After the complete construction of the component and of the auxiliary materials has been finished, a suitable laminating-bonding device is put in place with a precise fit above this mounting support, and the circumferential sealing compound that has previously been applied onto the vacuum foil is pre-compressed in such a manner that a vacuum-proof seal between the vacuum skin and the laminating-bonding device is created. Subsequently the construction is evacuated on the side of the laminating-bonding device.

The fuselage shell comprising stringers is manufactured with the device described above in that first the outer surfaces of the modular profiles are covered by a foil that is loosely in place. Subsequently, the hollow space formed by the spaces between the profiles is evacuated so that the foil is held by suction and is drawn in a form-accurate manner into the profile grooves and indentations. After this, the auxiliary materials can be placed onto the deep-drawn vacuum skin/foil. Subsequently, stringer profiles that have been embedded in support elements or form pieces are placed into the profile grooves covered by the vacuum skin/foil.

Positioning of the stringer takes place by way of the matching geometry of the depression and the form piece. Depending on the manufacturing method, all the skin layers comprising fiber-reinforced composite materials are placed, individually or as a packet, on outer surfaces, covered by the vacuum skin, of the modular profiles of the mounting support and the stringer profiles. Subsequently, an optimized quantity of a sealing compound is applied to the vacuum foil. By moving the thus prepared construction together, with a precise fit, with the laminating-bonding device the circumferential sealing compound is compressed in such a manner that a vacuum-proof seal between said vacuum skin/foil and the laminating-bonding device arises. In order to effect the transfer of the complete construction from the rigging device to the laminating-bonding device, the side of an additional rigging device is vented and subsequently a vacuum is applied on the side of the laminating-bonding device. As a consequence of this the entire construction is pressed at atmospheric pressure against the laminating-bonding device. Finally, the rigging device and the laminating-bonding device are moved apart, and the laminating-bonding device is rotated in order to be subjected to a curing process.

With quite strong opening angles of large fuselage shells this manufacturing solution is quite problematic. As a result of the strong opening angles, during insertion into a laminating-bonding device with the sticky-wet skin thereon, the auxiliary materials and the stringer base areas can rub against the outer positions, so that the mold surface needs to be designed so as to be slightly smaller. To prevent the stringers and the auxiliary materials from bridging the required gap in an uncontrolled manner during transfer within the laminating-bonding device, in which gap they are simply taken along with the enveloping vacuum foil, defined leading-in of the stringers and of the auxiliary materials is necessary.

Depending on the design of the stiffening elements in longitudinal direction (stringers), which can, for example, be the so-called omega-stringers (hat profile) or T-stringers, an undercut occurs, which makes it impossible for the rigging device and the laminating-bonding device to move apart from each other. In the case of omega stringers this depends on the angles of the profile and the opening angle of the shell. In the case of a T-stringer the undercut point occurs practically immediately when the geometry of the cavity precisely corresponds to that of the stringer. The cavities for accommodating the stringers can be cut free in such a manner that the moving apart of the rigging device and the laminating-bonding device is ensured. However, in the case of large opening angles a further problem then arises, namely that of affixing the auxiliary materials. They are usually placed onto the free region between the stringer cavities and are affixed in that position. If the stringer cavity is cut free strongly, hardly enough space remains for neat positioning of the auxiliary materials. Furthermore, the outer geometry of the supporting element or of the form piece is determined by the undercut angle, i.e. the form pieces surrounding the stringer become so large that they cover the complete skin, in other words extend to the next stringer profile. This is problematic from the point of view of manufacturing technology.

BRIEF SUMMARY OF THE INVENTION

An aspect of the present invention relates to a device and a corresponding method for manufacturing a fiber-reinforced composite fuselage shell for an aircraft, which fuselage shell is suitable for efficient, reproducible, series production and allows reliable and simple manufacture of strongly curved fuselage shells.

An aspect of the invention includes the technical teaching according to which on the curved mounting surface of a rigging support several actuators are affixed that extend radially outwards and that are longitudinally adjustable, wherein at the distal ends of said actuators in each case mold channels for receiving the stringers are attached, which mold channels are interconnected by means of flexible intermediate elements and/or further mold channels for forming a vacuum-tight closed, curved, mold surface.

The method according to an aspect of the invention provides an advantage, in particular, in that positioning of the stringers, placement of the auxiliary materials, and the application of the vacuum foil no longer need to be carried out on the component itself, but can be carried out on a separate rigging device. Consequently, the actual laminating-bonding device no longer needs to be occupied for the duration of rigging, because the process of transferring the stringer and the vacuum construction accounts for only a comparatively small component of the manufacturing time. All the manufacturing steps, namely rigging and placing the half shell to be constructed into the laminating-bonding device can occur in parallel. Positioning the stringers takes place by simple insertion into the prepared depressions of the device according to the invention, in which depressions the stringer is then neatly guided. It is no longer necessary, as has been the case up to now, to place the vacuum foil in strong folds; instead, said foil is either deep-drawn into the prepared depressions of the mold surface or is correspondingly pre-draped and subsequently subjected to a vacuum. With the use of the longitudinally adjustable actuators, and the resulting change in the mold surface it is possible, in particular, to manufacture fuselage shells with strong opening angles by means of the rigging device. Thus the pronounced undercuts, which are present in the case of fuselage shells with strong opening angles, no longer hinder demolding, and precise positioning is nevertheless possible thanks to the mold surface that can be adjusted according to the invention. In the case of an already cured stringer it is even possible for form pieces to be done without, either partly or entirely. In the case of the so-called co-curing method the outer geometry of the forming supporting elements no longer depends on the undercut angle; said supporting elements can thus be greatly simplified. In addition, the solution according to the invention makes it possible to press a sealing seam, which us usually present in vacuum constructions, against the laminating-bonding device. Adjusting the actuators could, if required, also take place to a different extent, because usually a larger offset gap is necessary at the side flanks than in the region of the middle of the fuselage shell. The contact pressing force of the stringers against the component during the transfer process can be set with precision, so that excessive pressing can be excluded. Excessive pressing would, for example, be possible in the case of large and very heavy devices as a result of unintended bending of the rigging device. In this case a heavy load would be resting on the stringer, which could result in damage.

In other words, the rigging device according to an embodiment of the invention comprises a structural base frame, for example a steelwork frame and a curved mold surface that comprises the mold channels that can be made from plastic or metal. Furthermore, by means of the actuators, for example pneumatics cylinders, the mold channels are adjustably mounted on the base frame. Depending on the requirements of the fuselage shell to be manufactured, it is also possible for several mold channels together to be operated by way of a single actuator.

According to a measure that improves the invention, it is proposed that the actuators be hingeably mounted, by way of associated joints, on the mounting surface of the base frame. In this manner the actuator including the mold channel that has been affixed at the end can be simply installed and if applicable readjusted, according to the planned desired position. However, during normal operation the set position remains invariable. This can take place during installation by blocking the joint with the use of clamping means or the like, or by means of corresponding elongated holes.

According to another additional aspect that improves the invention, it is possible to interconnect in an airtight manner the individual mold channels along the longitudinal edges by means of an elastic belt as a flexible intermediate element. Consequently, the required flexibility of the device according to the invention in radial direction can be produced in a simple manner.

As an alternative to this it is, however, also imaginable to design the flexible intermediate element as a type of hinge, wherein the actuator is provided for folding down a side flank of the mold surface, which side flank can be hinged over the aforesaid. In the case of strongly-curved fuselage shells such a hinge would preferably have to be of an elastic design, for example as a rubber casting compound. By way of the actuator, preferably several mold channels that are strung together in longitudinal direction and that are rigidly connected can be folded down inwards by means of the actuator. In this arrangement, readjustment of the stringer position could take place by means of exchangeable limit-stop platelets in various thicknesses in the narrow depression region of the mold channel.

According to another measure that improves the invention it is proposed for the base of the groove of the mold channel to comprise vacuum connections for the mold surface. The mold surface is designed so as to be vacuum-tight, and by means of the vacuum connections and the distribution system connected to said vacuum connections, holes or grooves/channels for guiding the vacuum can be produced as required.

According to a further measure that improves the invention it is proposed for the cavity region of the mold channel to comprise several positioning sections that are arranged so as to be spaced apart from each other and that correspond to the desired position of the stringer to be inserted. Thus, at the position of the positioning sections the cross section of the mold channel is preferably reduced by a few millimeters down to the desired external dimensions of the stringer to be inserted in this location. At this position the stringer is then guided in a simple manner and positioned precisely. In addition, in regions of the positioning sections it is also possible to affix, preferably to the rear, magnets or the like for affixing the stringers.

To be able to move the rigging device and the laminating-bonding device together, either the laminating-bonding device or the rigging device needs to be rotated. To this effect the rigging device can be moved, on a transfer carriage with a lifting mechanism, underneath the rotated laminating-bonding device. In the second solution the rigging device can be installed in a lifting-rotating station in order to in this manner move the rigging device that has been rotated in this manner together with the permanently stationary laminating-bonding device. Positioning the rigging device and laminating-bonding device can, for example, be ensured by guiding sleeves and guiding pins. After moving the rigging device, which comprises the components of the fuselage shell to be manufactured, into the laminating-bonding device the subsequent joining process/curing process can be carried out, which arises, in a manner known per se, from the general state of the art.

The following method-related steps are proposed for manufacturing a fuselage shell for an aircraft with a device described above:

a) extending the actuators to the transfer position in order to form a mold surface that corresponds to the initial position,
b) drawing a vacuum foil onto the mold surface and sealing said vacuum foil,
c) bonding pre-fabricated auxiliary material panels into the regions between cavities/depressions of adjacent mold channels,
d) inserting stringers into the mold channels so that they extend parallel to the auxiliary material panels,
e) retracting the actuators in order to form a retracted position for the spaced-apart positioning of the occupied mold surface beneath or above an associated laminating-bonding device,
f) extending the actuators to the transfer position for pressing the occupied mold surface against a correspondingly formed counter-surface of the laminating-bonding device,
g) undoing the evacuation on the side of the mold surface and starting the evacuation on the side of the laminating-bonding device for transferring the construction previously placed onto the mold surface,
h) retracting the actuators into the retracted position for moving apart the rigging device and the laminating-bonding device.

In addition it is proposed, in the context of an additional intermediate step that follows on from inserting the stringers, to insert the end piece comprising sealant into the ends of the cavities/depressions of the mold channels. As a result of this, in a simple manner at this position a continuous depression is filled. Thus, on the face, again a smooth surface is created for connecting the sealing belt to the surface of the laminating-bonding device.

After the vacuum build-up for the fuselage shell has been prepared in the manner according to the invention, curing and thus bonding of the outer skin to the stringers can take place in an autoclave.

After the vacuum build-up for the fuselage shell has been prepared in the manner according to the invention, curing and thus bonding of the outer skin to the stringers can take place in an autoclave. After curing, the auxiliary materials and the vacuum foil are removed and the fuselage shell is taken from the laminating-bonding device. Said fuselage shell should, preferably immediately afterwards, be subjected to machining if necessary, and to quality control. Thereafter, installation to obtain the finished fuselage can be carried out.

BRIEF DESCRIPTION OF THE DRAWINGS

Below, further measures that improve the invention are shown in more detail with reference to the figures, together with a description of preferred exemplary embodiments of the invention. The following are shown.

DETAILED DESCRIPTION

Figure 1:
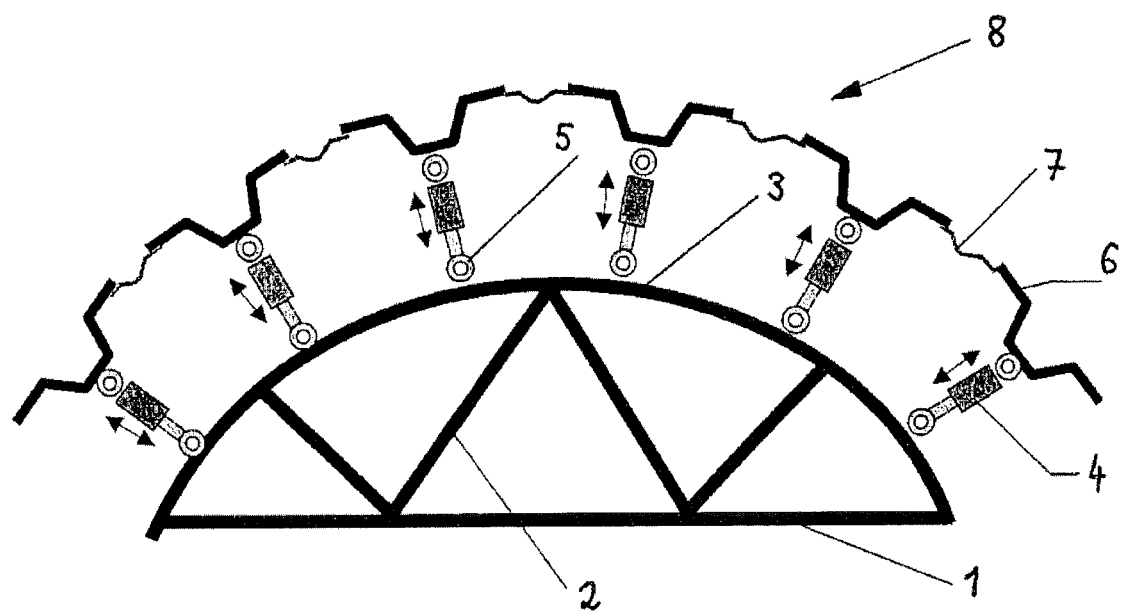
FIG. 1 a diagrammatic front view of a rigging device for manufacturing fuselage shells according to a first embodiment, FIG. 2 a diagrammatic front view of a rigging device for manufacturing fuselage shells according to a second embodiment, FIG. 3 a perspective view of an exemplary mold channel with integrated positioning means, and FIGS. 4a-4h a diagrammatic sequence of figures for illustrating the manufacturing method preferably to be carried out by means of the device.

According to FIG. 1 a rigging device essentially comprises a base frame 1 for forming a curved mounting surface 3 and for manufacturing a rigid substructure. Several radially-outward extending actuators 4 have been affixed to the mounting surface 3. On the side of the mounting surface 3 the actuators 4 have been hingeably installed by way of joints/elongated holes 5 and in each case at their distal ends comprise mold channels 6 for receiving stringers (not shown in detail) of the fuselage shell. The individual mold channels 6 are interconnected with pliable/elastic intermediate elements 7 in such a manner that overall a mold surface 8 forms that is closed so as to be vacuum tight.

In this exemplary embodiment the flexible intermediate elements 7 are designed as elastic belts.

Figure 2:
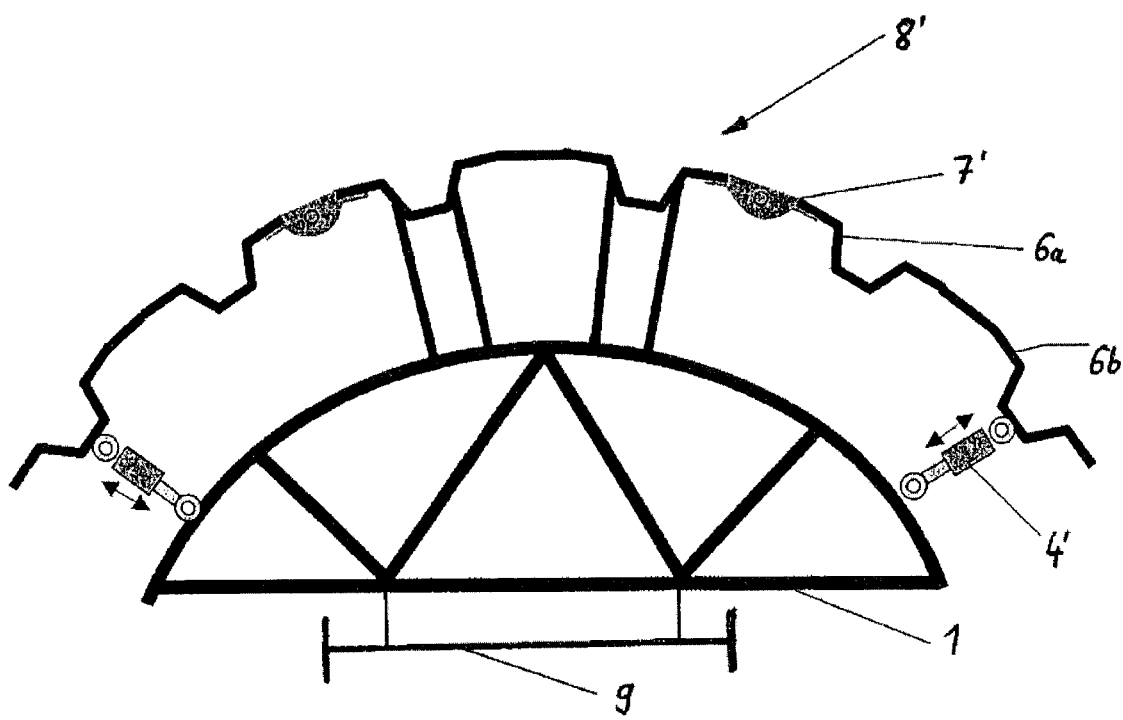

In the exemplary embodiment shown in FIG. 2, several adjacent mold channels 6a, 6b are rigidly interconnected and are hinged to the base frame 1 by way of a flexible intermediate element 7' designed as a hinge.

By means of a shared actuator 4' the rigidly interconnected mold channels 6a and 6b are swivellable in the joint formed by the flexible intermediate element 7' so that the two opposite side components of this rigging device can be folded down in the direction of the base frame 1.

In the diagram the base frame 1 is mounted on a transfer carriage 9 with a lifting mechanism in order to align the entire device for positioning relative to a laminating-bonding device (not shown in detail) arranged above the aforesaid.

Figure 3:
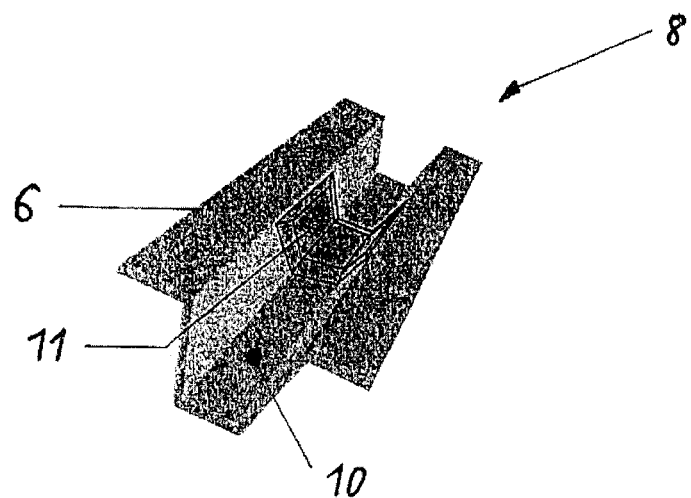

According to FIG. 3, the mold channel 6, which in this embodiment is made from metal, of the device comprises vacuum connections 10, by means of which the mold surface 8 can be evacuated. Furthermore, the groove region of the mold channel 6 comprises a positioning section 11 that reduces the groove cross section, against which positioning section 11 a stringer comes to rest during manufacture in order to precisely align said stringer within the device.

Figure 4A:
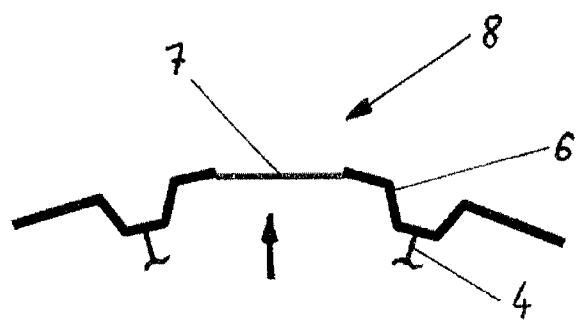

In the sequence of the following FIGS. 4a to 4h the steps for manufacturing a fuselage shell with the use of the device described above in FIG. 1 is illustrated:

According to FIG. 4a, a transfer position of the device is taken up in which the actuators 4 are extended in the direction of the arrows. This results in a curved mold surface 8 that corresponds to the desired position, in which mold surface 8 the flexible intermediate elements 7 arranged between the individual mold channels 6 are tensioned.

Figure 4B:
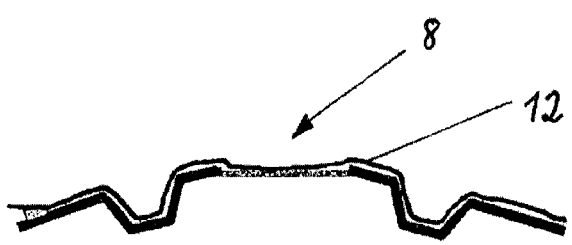

According to FIG. 4*b*, subsequently a vacuum foil 12 is applied to the mold surface 8 in order to seal said mold surface 8.

Figure 4C:
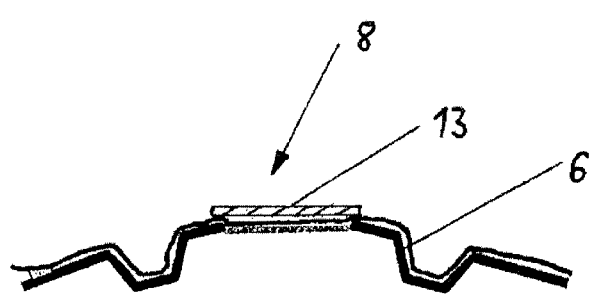

According to FIG. 4*c*, subsequently prefabricated auxiliary material panels 13 are applied to the mold surface 8 in the region between adjacent mold channels 6.

Figure 4D:
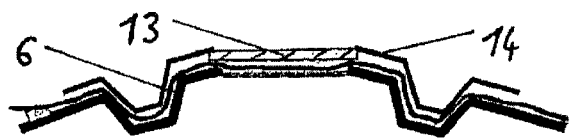

According to FIG. 4*d*, subsequently in each case associated stringers 14 made of carbon-reinforced plastic are inserted in the mold channels 6 in such a manner that, depending on the design and manufacturing method, at the edges they do not overlap at all with the auxiliary material panels 13 or overlap with them partly or fully.

Figure 4E:
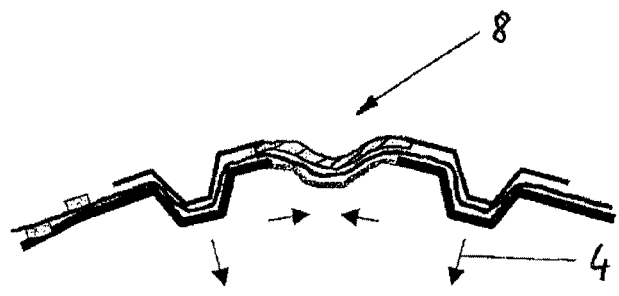
Figure 4:
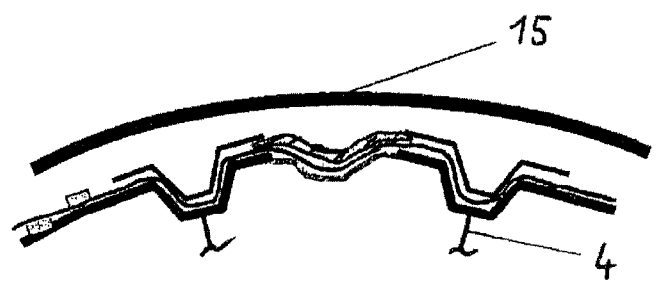

According to FIG. 4*e*, subsequently the actuators are retracted so that the flexible intermediate elements 7 also relax in order to move the mold surface 8 to a retracted position.

According to FIG. 4*f*, subsequently in this retracted position a laminating-bonding device 15, is placed above or below a rigging device, which laminating-bonding device is complete with a skin and any required pressure plates or auxiliary materials, and the actuators 4 are subsequently extended to a transfer position in order to cause pressing of the occupied mold surface 8 and thus of the stringers against a correspondingly formed counter-surface of the laminating-bonding device with a skin 15.

Figure 4G:
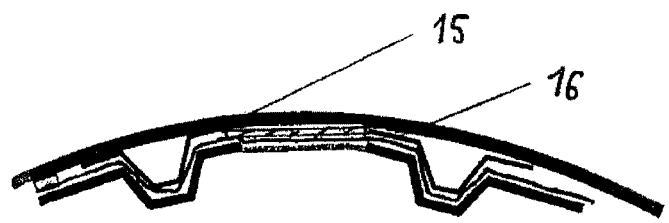

After the evacuation on the side of the mold surface 8 has been completed according to FIG. 4*g*, evacuation on the opposite counter surface on the side of the laminating-bonding device 15 takes place. As a result of this the stringers and the auxiliary materials are pushed by the atmospheric pressure against the laminating-bonding device 15 and is thus transferred to the laminating-bonding device 15.

Figure 4H:
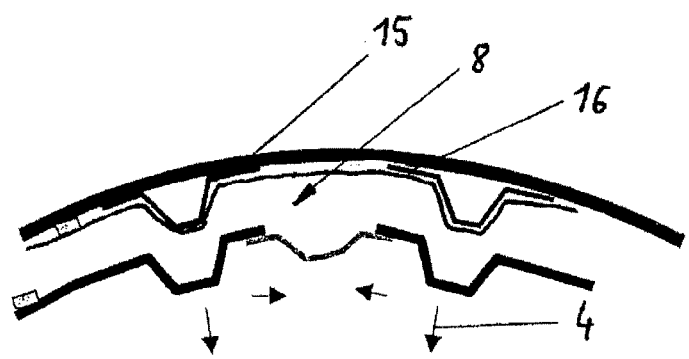

In the last method-related step illustrated in FIG. 4*h* the actuators 4 are retracted again in order to move the device to the retracted position (avoiding undercuts) so that the strongly-curved fuselage shell 16 can be de-molded without any problems.

The invention is not limited to the two above-described preferred embodiments of the rigging device for manufacturing a fuselage shell for an aircraft. Instead, modifications of this that are included in the scope of protection of the following claims are also imaginable. For example, it is also possible, instead of pneumatic actuators to use electric-motor-driven linear drives or hydraulic cylinders. Likewise the retracted position for strongly curved fuselage shells can also be caused by other intermediate elements that change the mold surface.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

LIST OF REFERENCE CHARACTERS

1 Base frame
2 Supporting wall
3 Mounting surface
4 Actuator
5 Joint
6 Mold channel
7 Intermediate element
8 Mold surface
9 Transfer carriage
10 Vacuum connection
11 Positioning section
12 Vacuum foil
13 Auxiliary material panel
14 Stringer
15 Laminating-bonding device
16 Fuselage shell

The invention claimed is:

1. A device for manufacturing a fiber-reinforced fuselage shell for an aircraft, wherein the fuselage shell comprises a plurality of stringers spaced apart from each other, the device comprising:
a base frame for forming a load-bearing, rigid, substructure with an outwardly-curved mounting surface for the positive-rigging of a fiber-reinforced fuselage shell to be manufactured;
a plurality of actuators affixed to and extending radially outwards from the outwardly-curved mounting surface and being longitudinally adjustable;
a plurality of mold channels attached at the distal ends of the plurality of actuators and configured for receiving the plurality of stringers;
wherein the plurality of mold channels are interconnected by at least one of a plurality of elastic belts and additional mold channels for forming a vacuum-tight closed mold surface, wherein the plurality of elastic belts are arranged along longitudinal edges of the mold channels; and
wherein the plurality of actuators are hingeably mounted, by associated joints, on the outwardly-curved mounting surface.

2. A device for manufacturing a fiber-reinforced fuselage shell for an aircraft, wherein the fuselage shell comprises a plurality of stringers spaced apart from each other, the device comprising:
a base frame for forming a load-bearing, rigid, substructure with an outwardly-curved mounting surface for the positive-rigging of a fiber-reinforced fuselage shell to be manufactured,
a plurality of actuators affixed to and extending radially outwards from the outwardly-curved mounting surface and being longitudinally adjustable;
a plurality of mold channels attached at the distal ends of actuators and configured for receiving the plurality of stringers;
wherein the plurality of mold channels are rigidly interconnected by at least one of a plurality of hinges and additional mold channels for forming a vacuum-tight closed mold surface, wherein the plurality of hinges are arranged along longitudinal edges of the mold channels; and
an actuator for folding down a side flank of the closed mold surface, wherein the side flank is configured to be hinged over the closed mold surface;
wherein the actuator is hingeably mounted, by associated joints, on the outwardly-curved mounting surface.

3. The device of claim 2, wherein the plurality of rigidly interconnected mold channels is adjustable by way of the actuator shared among the plurality of interconnected mold channels.

4. The device of claim 1, wherein each of the plurality of mold channels comprises a groove for guiding vacuum and vacuum connections for the closed mold surface.

5. The device of claim 1, wherein each of the plurality of mold channels comprises a groove region, wherein the groove region comprises a plurality of positioning sections arranged so as to be spaced apart from each other and reducing the diameter of a groove cross section of the groove region, and corresponding to the desired geometry of one of the plurality of stringer to be inserted.

6. The device of claim 1, wherein the base frame is configured to be moved on a transfer carriage with a lifting mechanism or a lifting-rotating device for moving together a laminating-bonding device and the device for manufacturing the fuselage shell, and for positioning the laminating-bonding device and the device for manufacturing the fuselage shell relative to each other.

* * * * *